US012710903B2

(12) United States Patent
Anno

(10) Patent No.: US 12,710,903 B2
(45) Date of Patent: Aug. 18, 2026

(54) METHODS, APPARATUSES, AND COMPUTER PROGRAM PRODUCTS FOR IMPLEMENTING CLOUD CONNECTED PRINTERS AND AN ADAPTIVE PRINTER-BASED APPLICATION FRAMEWORK

(71) Applicant: ZEBRA TECHNOLOGIES CORPORATION, Lincolnshire, IL (US)

(72) Inventor: Bret M. Anno, Mundelein, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 241 days.

(21) Appl. No.: 18/761,290

(22) Filed: Jul. 1, 2024

(65) Prior Publication Data

US 2024/0354035 A1 Oct. 24, 2024

Related U.S. Application Data

(63) Continuation of application No. 17/873,947, filed on Jul. 26, 2022, now Pat. No. 12,026,412, which is a (Continued)

(51) Int. Cl.
*G06F 3/12* (2006.01)
*H04L 9/40* (2022.01)
*H04L 67/125* (2022.01)

(52) U.S. Cl.
CPC .......... *G06F 3/1236* (2013.01); *G06F 3/1206* (2013.01); *G06F 3/1211* (2013.01); (Continued)

(58) Field of Classification Search
USPC ........................................................ 358/1.15
See application file for complete search history.

(56) References Cited

U.S. PATENT DOCUMENTS 5,652,711 A 7/1997 Vennekens
5,983,243 A 11/1999 Heiney et al.
(Continued)

FOREIGN PATENT DOCUMENTS

CN 1452552 A 10/2003
CN 101101534 A 1/2008
(Continued)

OTHER PUBLICATIONS

Fette, I. et al. The WebSocket Protocol, Internet Engineering Task Force (IEFT), RFC 6455, ISSN: 2070-1721 (Dec. 2011) 71 pages, Copy not provided; cited in U.S. Appl. No. 17/873,947 to which priority is claimed.

(Continued)

*Primary Examiner* — Jacky X Zheng

(57) ABSTRACT

Methods, apparatuses, and computer program products are provided to facilitate connections between devices, such as a printer and a cloud-based server, and to implement an adaptive application framework. In the context of an apparatus, a printer is provided comprising communications circuitry configured to facilitate communications with a network; and processing circuitry configured to transmit a connection request to the network; receive requested connection parameters from the network; transmit printer connection parameters to the network; and establish a first secure connection between the printer and the network. The printer comprising processing circuitry further configured to receive requested connection parameters comprising at least a signed security certificate and a DNS name for a server on the network and to verify the signed security certificate and the DNS name for the server. The printer comprising processing circuitry further configured to transmit printer connection parameters comprising at least a signed security certificate for the printer.

20 Claims, 7 Drawing Sheets

Related U.S. Application Data continuation of application No. 16/800,116, filed on Feb. 25, 2020, now Pat. No. 11,526,313, which is a continuation of application No. 16/400,855, filed on May 1, 2019, now abandoned, which is a continuation of application No. 15/091,769, filed on Apr. 6, 2016, now Pat. No. 10,318,216, which is a continuation of application No. 13/773,069, filed on Feb. 21, 2013, now Pat. No. 9,335,958.

(60) Provisional application No. 61/751,857, filed on Jan. 12, 2013, provisional application No. 61/601,471, filed on Feb. 21, 2012.

(52) U.S. Cl.
CPC .......... *G06F 3/1222* (2013.01); *G06F 3/1238* (2013.01); *G06F 3/1243* (2013.01); *G06F 3/1285* (2013.01); *G06F 3/1287* (2013.01); *H04L 63/08* (2013.01); *H04L 63/0823* (2013.01); *H04L 63/029* (2013.01); *H04L 63/0869* (2013.01); *H04L 63/166* (2013.01); *H04L 63/168* (2013.01); *H04L 67/125* (2013.01)

(56) References Cited

U.S. PATENT DOCUMENTS

| | | | | |
|---|---|---|---|---|
| 6,184,996 | B1 | 2/2001 | Gase | |
| 6,209,048 | B1 | 3/2001 | Wolff | |
| 6,587,647 | B1 | 7/2003 | Wantabe et al. | |
| 6,738,841 | B1 | 5/2004 | Wolff | |
| 6,798,997 | B1 | 9/2004 | Hayward et al. | |
| 7,126,716 | B1 | 10/2006 | Kaufman et al. | |
| 9,335,958 | B2 | 5/2016 | Anno et al. | |
| 9,830,112 | B2 | 11/2017 | Sakai et al. | |
| 2002/0015166 | A1 | 2/2002 | Wakai et al. | |
| 2002/0016833 | A1 | 2/2002 | Yajima et al. | |
| 2002/0114013 | A1 | 8/2002 | Hyakutake et al. | |
| 2002/0163662 | A1 | 11/2002 | Kaufman et al. | |
| 2002/0196451 | A1 | 12/2002 | Schlonski et al. | |
| 2006/0279779 | A1 | 12/2006 | Kaufman et al. | |
| 2007/0013941 | A1 | 1/2007 | Anno | |
| 2007/0146474 | A1 | 6/2007 | Kameda et al. | |
| 2007/0234053 | A1* | 10/2007 | Kudo | H04L 9/3263 713/169 |
| 2007/0266237 | A1 | 11/2007 | Kuroki | |
| 2010/0030872 | A1 | 2/2010 | Caleca et al. | |
| 2010/0141993 | A1 | 6/2010 | Dowling et al. | |
| 2010/0268659 | A1 | 10/2010 | Zimberoff et al. | |
| 2011/0176162 | A1 | 7/2011 | Kamath et al. | |
| 2012/0036570 | A1 | 2/2012 | Wada et al. | |
| 2012/0081749 | A1 | 4/2012 | Kitada | |
| 2012/0133974 | A1* | 5/2012 | Nakamura | G06F 3/122 358/1.15 |
| 2012/0204032 | A1 | 8/2012 | Wilkins et al. | |
| 2013/0163017 | A1 | 6/2013 | Matsuda | |
| 2014/0368859 | A1 | 12/2014 | Gutnik et al. | |
| 2017/0109106 | A1 | 4/2017 | Ohara | |

FOREIGN PATENT DOCUMENTS

| | | | |
|---|---|---|---|
| CN | 101841621 | | 9/2010 |
| CN | 102184433 | A | 9/2011 |
| EP | 1274002 | A2 | 1/2003 |
| JP | 2003296053 | A | 10/2003 |

OTHER PUBLICATIONS

Smith, R., The Future of the web: HTML5 Web Socket [online] [retrieved Nov. 24, 2010]. Retrieved from the Internet <URL:http:/ricsmith.sys-con.com/node/677813>. (dates Aug. 16, 2008), pp. 1-6 (XP-002610911), Copy not provided; cited in U.S. Appl. No. 17/873,947 to which priority is claimed.

Office Action for European Patent Application No. 13708980.1 mailed on Oct. 19, 2018, Copy not provided; cited in U.S. Appl. No. 17/873,947 to which priority is claimed.

Saint-Andre et al.: "Represenation and Verification of Domain-Based Application Service Identity in Certificates Used with Transport Layer Security", Internet Engineering Task Force, No. 9 pp. 1-41 (Aug. 7, 2010) [retrieved on Aug. 7, 2010] [https://tools.ielf.org/id/draft-saintandre-tis-server-id-check-08.html], Copy not provided; cited in U.S. Appl. No. 17/873,947 to which priority is claimed.

Office Action for European Patent Application No. 13708980.1 mailed on Dec. 7, 2017, Copy not provided; cited in U.S. Appl. No. 17/873,947 to which priority is claimed.

Office Action for Mexican Patent No. MX/a/2014/009824 mailed on Feb. 25, 2016, Copy not provided; cited in U.S. Appl. No. 17/873,947 to which priority is claimed.

Office Action for Mexican Patent No. MX/a/2014/009824 mailed on May 16, 2016, Copy not provided; cited in U.S. Appl. No. 17/873,947 to which priority is claimed.

Office Action for Chinese Patent Application No. 2013800095255 mailed on Oct. 21, 2016, Copy not provided; cited in U.S. Appl. No. 17/873,947 to which priority is claimed.

Extended Search Report for European Patent Application No. 19171409.6 mailed on May 19, 2021, Copy not provided; cited in U.S. Appl. No. 17/873,947 to which priority is claimed.

Extended Search Report for European Patent Application No. 19171409.6 mailed on Oct. 19, 2019, Copy not provided; cited in U.S. Appl. No. 17/873,947 to which priority is claimed.

Office Action for Chinese Patent Application No. 201810284331.0 mailed on Sep. 14, 2020, Copy not provided; cited in U.S. Appl. No. 17/873,947 to which priority is claimed.

International Search Report and Written Opinion for International Application No. PCT/US2013/027136 mailed on Jul. 22, 2013, Copy not provided; cited in U.S. Appl. No. 17/873,947 to which priority is claimed.

* cited by examiner

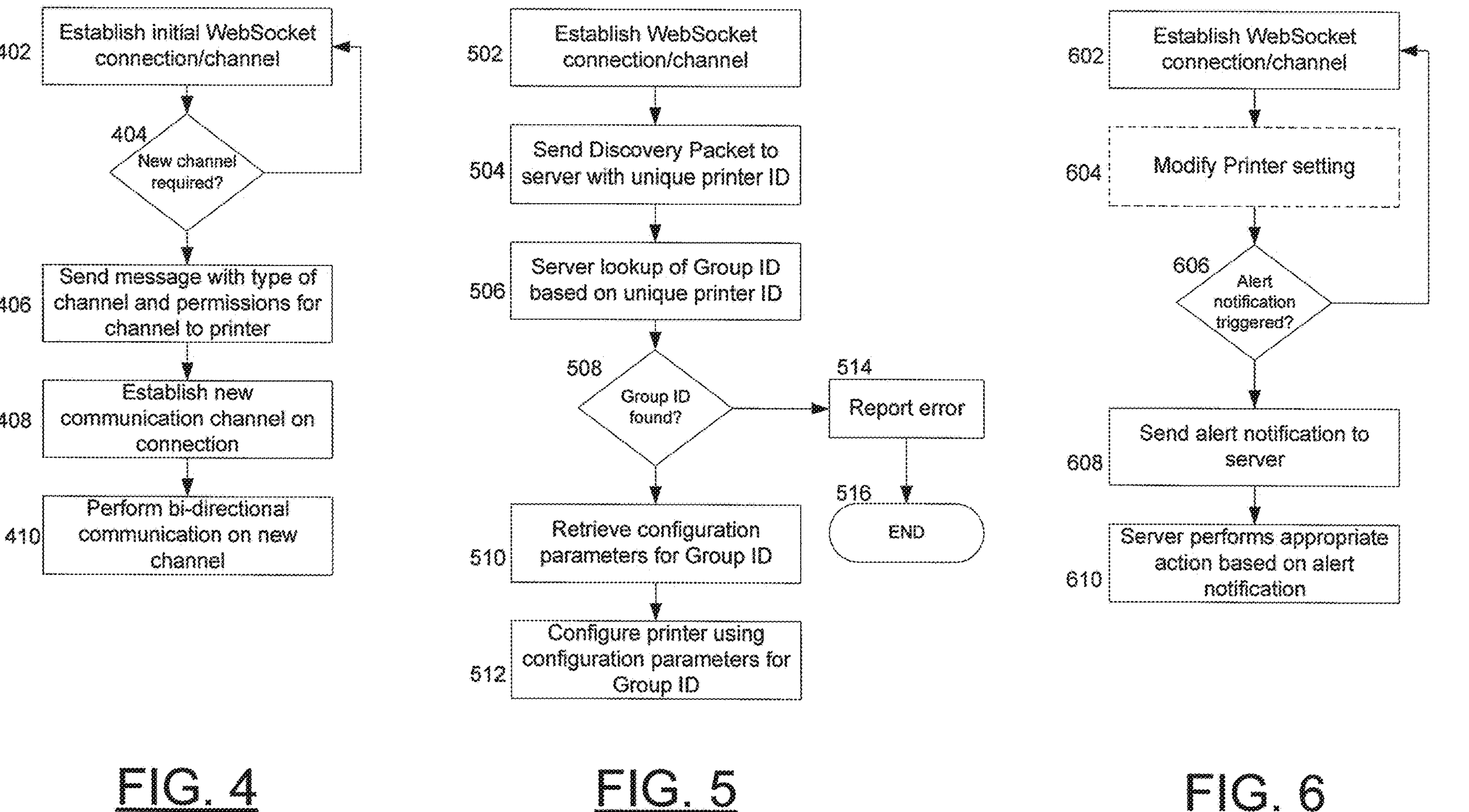
402
Establish initial WebSocket connection/channel
404
New channel required?
406
Send message with type of channel and permissions for channel to printer
408
Establish new communication channel on connection
410
Perform bi-directional communication on new channel
FIG. 4
502
Establish WebSocket connection/channel
504
Send Discovery Packet to server with unique printer ID
506
Server lookup of Group ID based on unique printer ID
508
Group ID found?
514
Report error
516
END
510
Retrieve configuration parameters for Group ID
512
Configure printer using configuration parameters for Group ID
FIG. 5
602
Establish WebSocket connection/channel
604
Modify Printer setting
606
Alert notification triggered?
608
Send alert notification to server
610
Server performs appropriate action based on alert notification
FIG. 6

METHODS, APPARATUSES, AND COMPUTER PROGRAM PRODUCTS FOR IMPLEMENTING CLOUD CONNECTED PRINTERS AND AN ADAPTIVE PRINTER-BASED APPLICATION FRAMEWORK

CROSS-REFERENCE TO RELATED APPLICATIONS

This patent arises from a continuation of U.S. patent application Ser. No. 17/873,947, filed on Jul. 26, 2022, which is a continuation of U.S. patent application Ser. No. 16/800,116, filed Feb. 25, 2020, which is a continuation of U.S. patent application Ser. No. 16/400,855, filed May 1, 2019, which is a continuation of U.S. patent application Ser. No. 15/091,769, filed Apr. 6, 2016, now U.S. Pat. No. 10,318,216, which is a continuation of U.S. patent application Ser. No. 13/773,069, filed Feb. 21, 2013, now U.S. Pat. No. 9,335,958, which claims the benefit of U.S. provisional application No. 61/601,471, entitled "Method And Apparatus For implementing An Adaptive Printer-Based Application Framework", filed on Feb. 21, 2012, and further claims the benefit of U.S. provisional application No. 61/751,857, entitled "Method and Apparatus For Implementing Cloud Connected Printers", filed on Jan. 12, 2013. The contents of U.S. patent application Ser. No. 15/091,769, U.S. patent application Ser. No. 13/773,069, U.S. provisional application No. 61/601,471, and U.S. provisional application No. 61/751,857 are hereby incorporated herein by reference in their entireties.

TECHNICAL FIELD

Embodiments of the present invention relate generally to the field of printer technology, and more particularly, example embodiments relate to implementing cloud-based connections between printers and servers and an adaptive printer-based application framework.

BACKGROUND

In many networks, managing printers typically requires setting up a central server or using a plurality of locally connected computers to manage the printers. Managing such printers remotely may require allowing external access by exposing the printers through a network firewall or by setting up a virtual private network (VPN) to access the network.

Applicant has identified a number of deficiencies and problems associated with establishing remote connections to printers and providing remote management of such printers. Through applied effort, ingenuity, and innovation, Applicant has solved many of the identified problems by developing solutions that are embodied by the present invention, which is described in detail below.

BRIEF SUMMARY

Methods, apparatuses and computer program products are therefore provided according to example embodiments of the present invention to facilitate connections between devices, such as a printer and a cloud-based server, and to implement an adaptive printer-based application framework.

In one embodiment, a printer is provided that at least includes communications circuitry configured to facilitate communications with a network; and processing circuitry configured to transmit a connection request to the network; receive requested connection parameters from the network; transmit printer connection parameters to the network; and establish a first secure connection between the printer and the network. In some embodiments, the connection request may comprise at least a request to upgrade the connection to a WebSocket connection.

In some embodiments, the requested connection parameters may comprise at least a signed security certificate and a DNS name for a server on the network and the processing circuitry may be further configured to verify the signed security certificate and DNS name for the server. In some embodiments, the printer connection parameters comprise at least a signed security certificate for the printer.

In some embodiments, the processing circuitry may be further configured to receive a request from the network to establish one or more communication channels over the first secure connection and establish the one or more communication channels over the first secure connection. In some embodiments, communications on each of the one or more communication channels may be independent of the status of each of the other of the one or more communication channels. In some embodiments, the one or more additional communication channels may be provided over the same connection or the one or more additional communication channels may each be provided over a separate connection. In some embodiments, the processing circuitry may be further configured to establish the one or more additional communication channels by sending the network a response message comprising a printer ID, a channel name, and a channel ID.

In some embodiments, the processing circuitry may be further configured to transmit or receive print commands over a first one of the one or more communication channels; and transmit or receive other data over at least a second one of the one or more communication channels. In some embodiments, the other data may comprise one or more of: file transfers, requests for printer status, changes in printer status, stored data, configuration information, changes in a communication channel, alert notifications, and firmware upgrades.

In some embodiments, the processing circuitry is further configured to store data in one or more memory locations and transmit the stored data over one of the one or more communication channels. In some embodiments, the processing circuitry may be further configured to receive data from one or more peripheral devices connected to the printer; and store the received data in the one or more memory locations.

In some embodiments, the processing circuitry may be further configured to transmit a message to the network over the secure connection, wherein the message comprises at least a unique printer identifier; receive configuration information from the network based at least in part on the message; and modify the printer configuration based on the received configuration information.

In some embodiments, the printer may further comprise a user interface providing an application front-end interface for an application implemented on the network.

In another embodiment, a server is provided comprising at least communications circuitry configured to facilitate communications with a network; and processing circuitry configured to receive a connection request from a printer; transmit requested connection parameters to the printer; receive printer connection parameters from the printer; and establish a first secure connection between the server and the printer. In some embodiments, the connection request may comprise at least a request to upgrade the connection to a WebSocket connection and the processing circuitry may be further configured to upgrade the connection to a WebSocket connection.

In some embodiments, the requested connection parameters may comprise at least a signed security certificate and a DNS name for the server. In some embodiments, the printer connection parameters may comprise at least a signed security certificate for the printer and the processing circuitry may be further configured to verify the signed security certificate for the printer.

In some embodiments, the processing circuitry may be further configured to transmit a request to the printer to establish one or more communication channels over the first secure connection; receive a reply from the printer to the request; and establish the one or more communication channels over the first secure connection. In some embodiments, the processing circuitry may be further configured to transmit or receive print commands over a first one of the one or more communication channels; and transmit or receive other data over at least a second one of the one or more communication channels. In some embodiments, the other data may comprise one or more of: file transfers, requests for printer status, changes in printer status, stored data, configuration information, changes in a communication channel, alert notifications, and firmware upgrades.

In some embodiments, the processing circuitry may be further configured to receive data from the printer over one of the one or more communication channels; process the received data; and transmit the processed output to the printer over the one of the one or more communication channels.

In some embodiments, the processing circuitry may be further configured to receive a message from the printer, wherein the message comprises at least a unique printer identifier; identify configuration information based at least in part on the received message; and transmit the configuration information to the printer.

In another embodiment, a computer program product is provided comprising at least one non-transitory computer-readable storage medium having computer-executable program code instructions stored therein, the computer-executable program code instructions comprising program code instructions, when executed, causing an apparatus to transmit a connection request to a network; receive requested connection parameters from the network; transmit apparatus connection parameters to the network; and establish a first secure connection between the apparatus and the network.

BRIEF DESCRIPTION OF THE DRAWINGS

Figure 2:
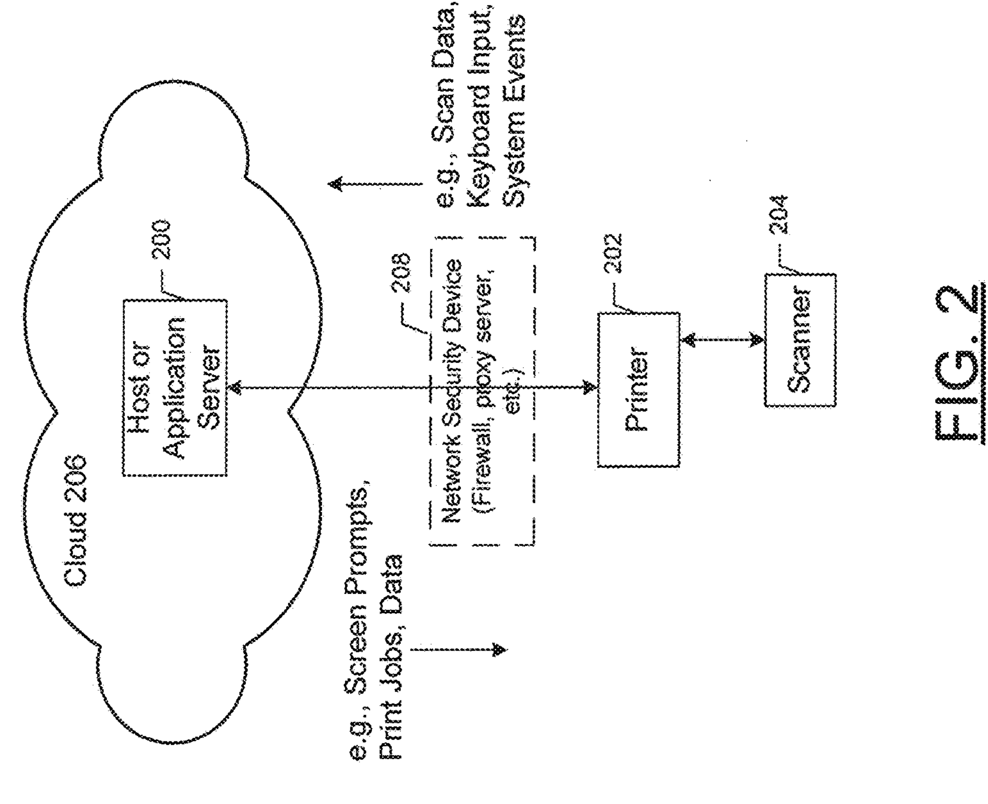
Figure 1:
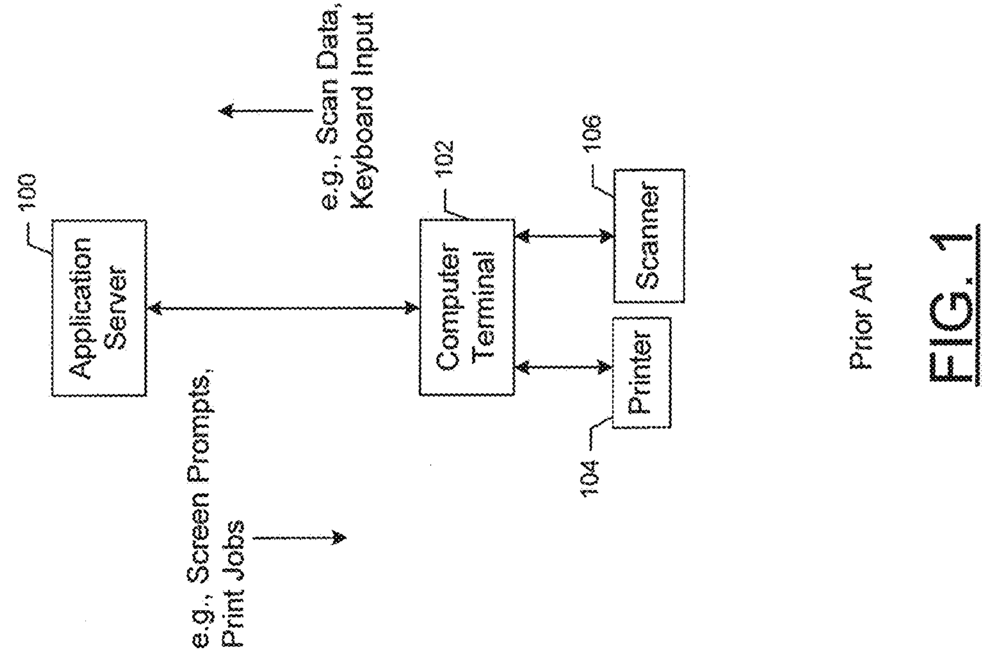
Figure 3:
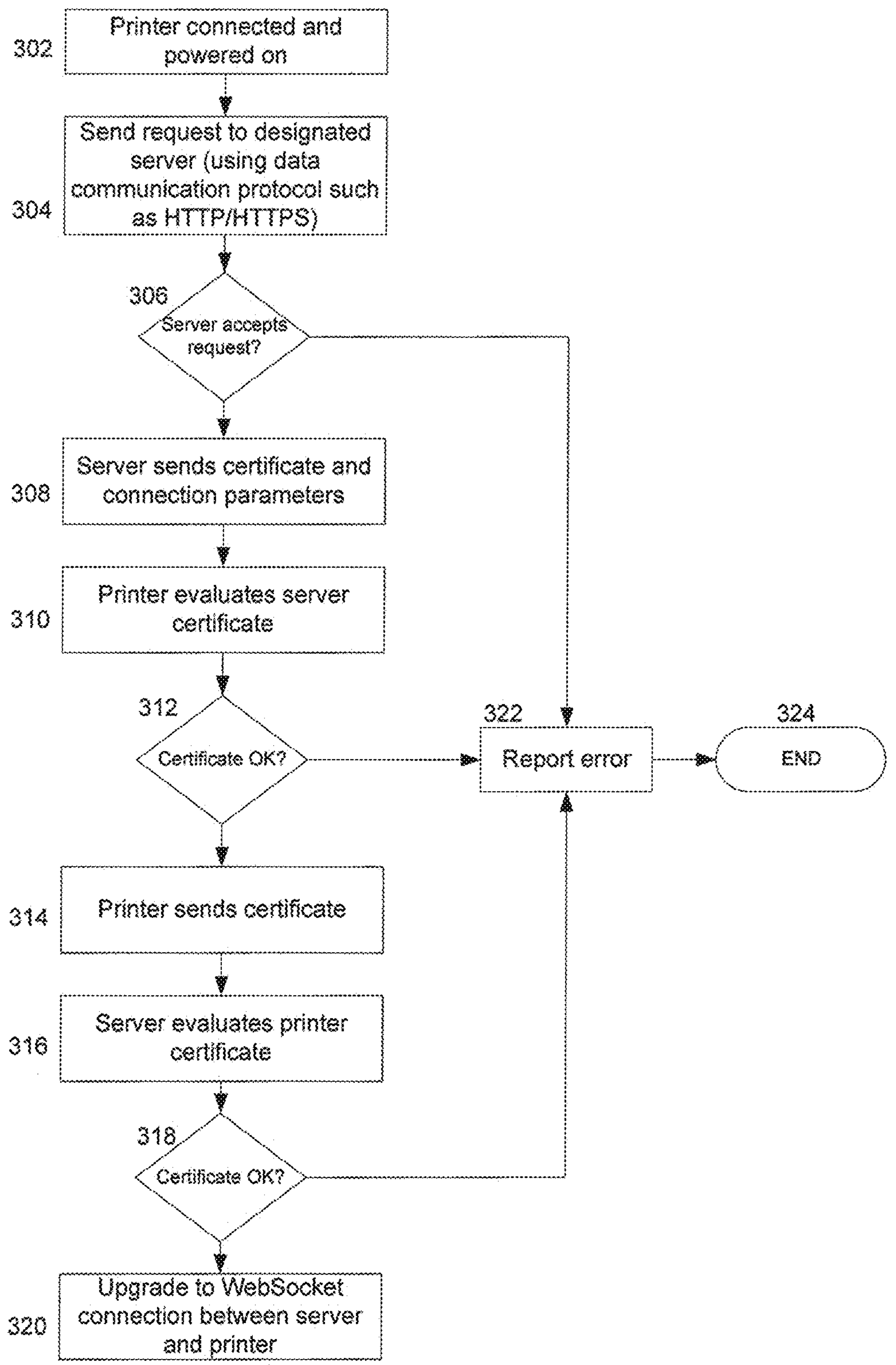
Figure 7:
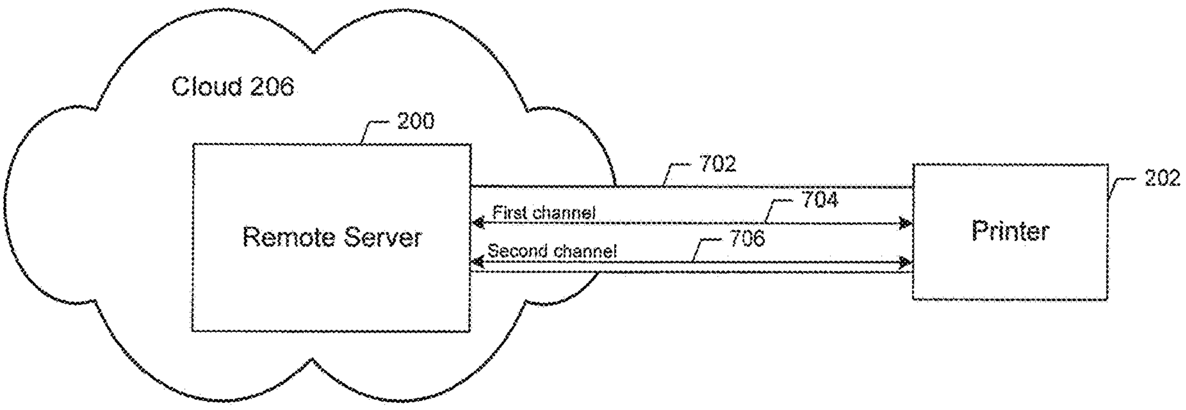
Figure 8:
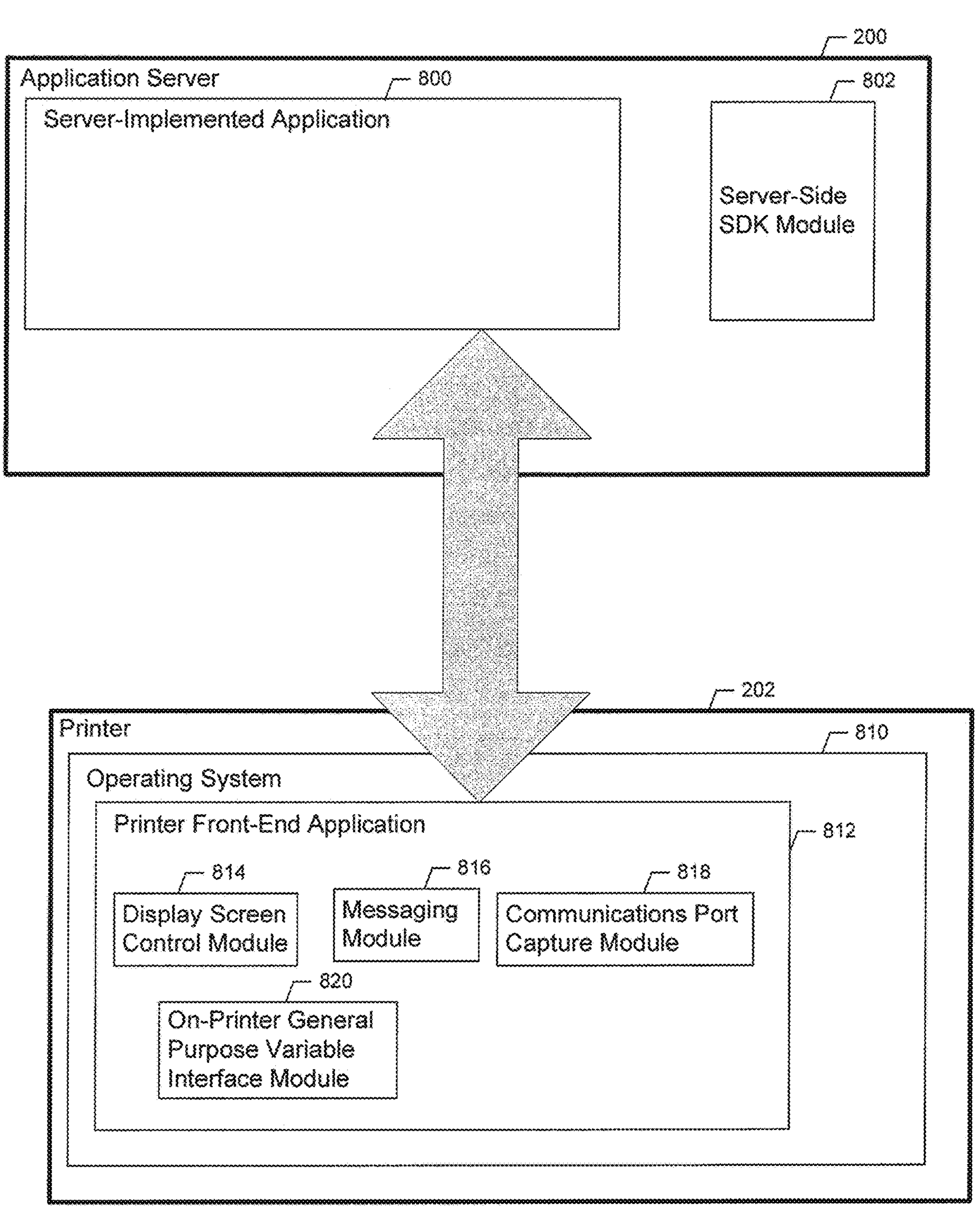
Figure 9:
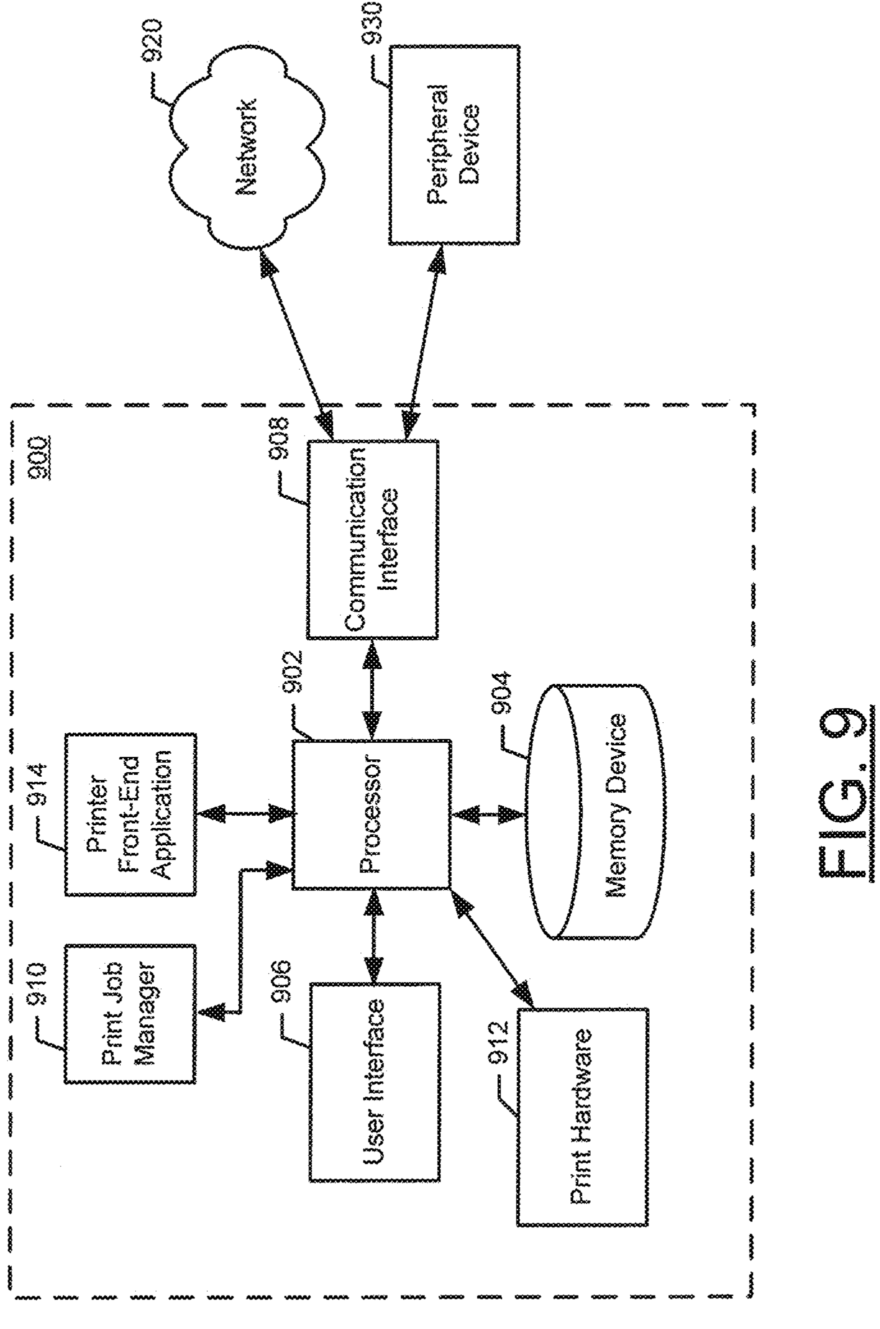
Figure 10:
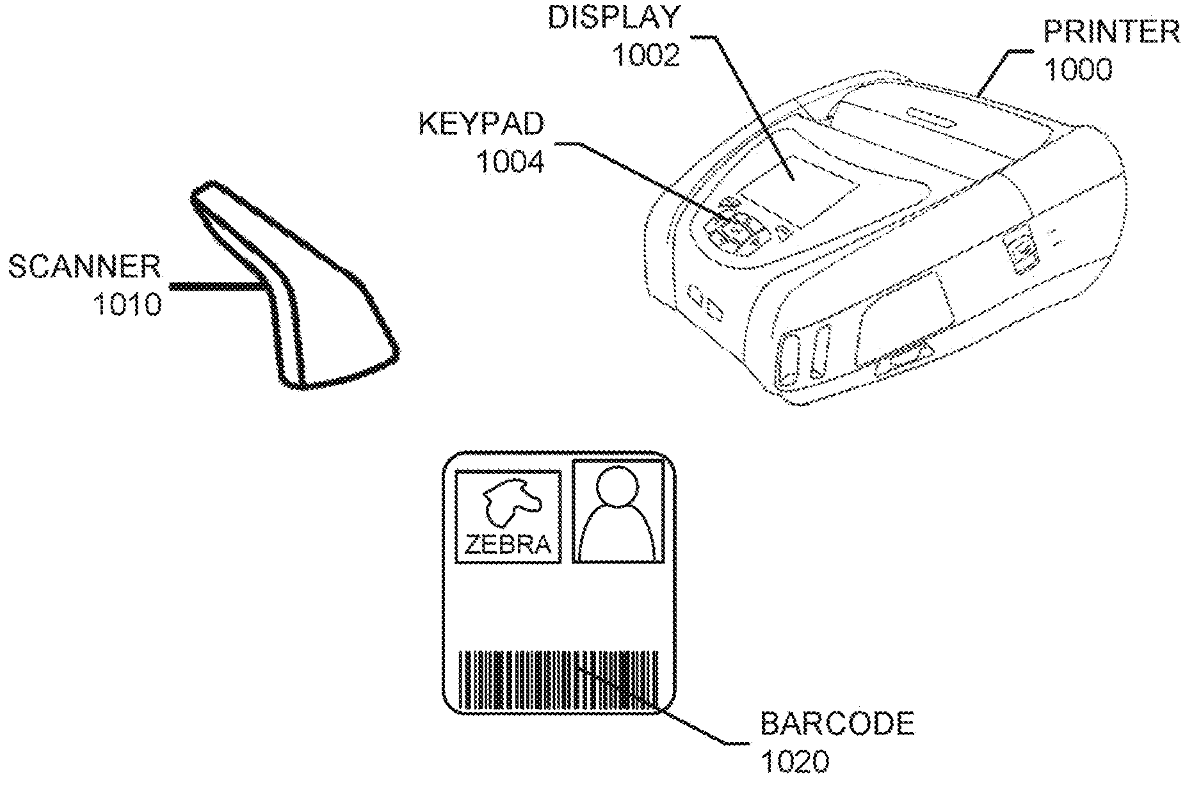

Having thus described certain embodiments of the invention in general terms, reference will now be made to the accompanying drawings, which are not necessarily drawn to scale, and wherein:

FIG. 1 illustrates an example system including a computer terminal for implementing applications;

FIG. 2 illustrates an example system that includes a printer configured to enable a connection to a cloud-based server according to various example embodiments;

FIG. 3 illustrates a flowchart of operations to provide a secure connection between a printer and a server according to various example embodiments;

FIG. 4 illustrates a flowchart of operations to establish multiple channels according to various example embodiments;

FIG. 5 illustrates a flowchart of operations to provide provisioning according to various example embodiments;

FIG. 6 illustrates a flowchart of operations to provide alert notifications according to various example embodiments;

FIG. 7 illustrates an example system including a printer connected to a cloud-based server over a secure connection with multiple separate channels according to various example embodiments;

FIG. 8 illustrates a software module architecture for an adaptive printer-based application framework according to various example embodiments;

FIG. 9 illustrates a block diagram of an example printing apparatus according to various example embodiments; and FIG. 10 is an illustration of printer system configured to support an adaptive printer-based application framework according to various example embodiments.

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

The following provides a description of various example apparatuses and methods that facilitate connections between devices, such as a printer and a cloud-based server. In this regard, according to some example embodiments, a printer may be configured to initiate a first connection to a server, which may reside either on an internal or external network, without waiting for the server to initiate the connection. In some example embodiments, the server may be a cloud-based server where the cloud is a distributed network and may be a public cloud (such as the Internet), private cloud, hybrid cloud, or the like, and where the server may be reachable in the cloud or network via a uniform resource locator (URL).

According to some example embodiments, the connections between the devices may provide for secure and/or encrypted connections and the devices may exchange security certificates to verify the identity of the devices and secure the connection. Such security certificates may further ensure that devices allow only authorized connections, such as a printer being assured it is connected to the correct server and a server allowing only connections from expected printers. According to some example embodiments, such servers and printers may only recognize security certificates signed by a designated Certificate Authority (CA), such as a printer manufacturer acting as the CA. In such embodiments, the servers and printers may not accept security certificates signed by third-party CAs, such as VeriSign. According to some example embodiments, a printer may be configured to connect to more than one server, such as to allow a connection to a server hosted by a printer manufacturer as well as connecting to an application server.

According to some example embodiments, upon establishing an initial connection, a printer and server may establish additional connections or channels to provide for specific types of communication between the devices. Such additional channels may, for example, only be established upon request by the server and the multiple additional channels may be provided over the same connection or may be separate connections between the server and the printer, such as transmission control protocol (TCP) connections. Such additional channels may provide for separation of the different types of communication (e.g. different protocols) between the server and the printer, and may, for example, include a proprietary command channel, a TCP RAW channel (e.g., behaving as if connected to port 9100), a file transfer channel, a firmware download channel, a secure RAW port, or any other type of appropriate channel. For example, establishing separate channels over the secure connection may allow for a printer to receive setting updates over a second channel even while it is receiving bandwidth filling print commands over its first channel. In some embodiments, such channels may provide for bi-directional communication between the server and the printer and may be configured to provide a persistent connection between the server and the printer. In some embodiments, the multiple additional channels may each be configured with one of a plurality of different security levels, such as to restrict a printer user's access to certain functionality.

According to some example embodiments, establishing the secure connection to a cloud-based server may allow for provisioning of the printer. After establishing the secure connection, the printer may send identifying information (e.g., a unique printer identifier) to the server to allow the server to retrieve appropriate configuration information and complete provisioning of the desired configuration for the printer. For example, traditional configuration processes might include direct connections to the printer for configuration at a user site or alternatively opening the printer box at the manufacturer, custom configuring the printer, repackaging the printer and shipping it to the customer site, or adjusting network security settings to allow remote connections to a printer through firewalls and proxy servers to allow for configuration. Instead, according to some example embodiments, a printer can effectively be configured or updated by servers residing in the cloud (i.e., remote servers that may be reached through private or public networks, such as the Internet). According to some example embodiments, a printer may be configured to connect through a user's network firewalls and/or proxy servers in a manner that does not require modification to standard network settings but still allows the printer to receive dynamic new configurations based on settings that are resident in the cloud (e.g., stored on a remote host server).

According to some example embodiments, the cloud connection may allow for a printer to send alert notifications to the server which the server may then act upon. In some embodiments, the printer may be configured to send alert notifications to the server based on an event or action at the printer, such as a configuration change, a printer status, a printer error, establishment of a new channel, change to a secure channel, change to data in a printer memory location (e.g., a user-defined setting or variable), or the like. In some embodiments, the server may be configured to perform some action based on the alert notification, such as sending messages to a user device (e.g., for a technician or administrator), providing data to an application implemented on the server, sending data to a management server, generating event traps, or the like, for example.

According to some example embodiments, a printer may be configured to allow for user-defined settings (e.g., storage variables in the printer memory) to be specified on the printer or updated through a printer interface. According to some example embodiments, these user-defined settings may be able to locally store data at the printer that can be sent to the server, such as over a cloud connection, so that the server may perform some operation using the data. For example, such user-defined settings may store a company name, logo, location, etc., that can be transmitted to the server for use in generating label formats to be sent to and printed by the printer. In some embodiments, these user-defined settings may contain data that is not acted on by the printer, but rather is merely transmitted to the server under certain conditions, such as a certain amount of data being stored in a user-defined setting. In some embodiments, the data stored in such user-defined settings may be provided through a printer interface by a connected peripheral device, such as a barcode scanner.

In some example embodiments, a printer-based application framework may be provided such that a printer may be configured to operate as a user interface front-end for applications that are stored and executed on a remote server to which the printer is connected via a network or cloud, such as by using a secure connection or channel. The printer may implement a printer front-end that enables applications executed on the remote server to use the printer as an interface to input and output information. The printer front-end application implemented on the printer may be configured to utilize the user interface of the printer, which may include an integrated keypad, a display, or peripheral devices (e.g., barcode scanner, magnetic stripe reader, RFID reader, card reader, NFC tag, NFC reader, weighing scale, keyboard, touchscreen, signature pad), to control or otherwise provide inputs that are provided to the remote server. According to some example embodiments, the printing device may be connected directly to a network to operate as a network printer, and is not connected to the network via an intermediate computer terminal. In some embodiments, the application framework may provide for execution of some application processes on the printer and execution of other application processes on the server.

FIG. 1 illustrates a conventional system that includes a computer terminal 102 as an intermediate device between the printer 104 and the application server 100. In this conventional system, the application server 100 interacts with the computer terminal 102 to provide screen prompts and print jobs, which may in turn be provided to the printer 104. The computer terminal 102 may also provide scan data (e.g., originating from the scanner 106) and keyboard input back to the application server 100 for analysis by the server.

FIG. 2 illustrates an example system according to various example embodiments. In the system of FIG. 2, the printer 202 may be connected directly to the server in an internal or external network (i.e., without an intermediate computer terminal). In some example embodiments, the printer 202 may be connected to the server 200 via a network (e.g., cloud 206) and devices that are configured to support the operation of the network. In some example embodiments, the printer 202 may be connected to the server 200 through network security devices, such as firewall 208, and the connection through the firewall 208 may initially be established upon a request from the printer 202 using a data communication protocol, such as HTTP/HTTPS.

In the example system of FIG. 2, the server 200 may interact with the printer 202 to provide provisioning or configuration information, print job formatting, data retrieval, screen prompts, print jobs, or any other appropriate functions. The printer 202 may also provide scan data (e.g., originating from the scanner 206 that is connected to the printer 202), keyboard input, system events, printer settings, stored data, and the like back to the server 200 for processing by the server 200. In some example embodiments, the printer 202 may be configured to implement a printer front-end application, via a hardware processor or processing circuitry, to interface with a specific server-implemented application for collaborative implementation. The specific server-implemented application may be implemented by a hardware processor or processing circuitry of the server 200.

According to some example embodiments, an adaptive printer-based application framework permits the development of applications that involve the use of a printer within an application server environment, without requiring an intermediate computer terminal. In other words, in some example embodiments, the adaptive printer-based application framework may permit software to be developed using code languages (e.g., Java and the like) and protocols that are more widely known and used in cloud computing environments, as opposed to software development that runs directly on a printer which may require knowledge of specific printer manufacturer languages and protocols (e.g., Zebra BASIC Interpreter (ZBI) and the like). As such, according to some example embodiments, application development may involve creating simplistic flows and user prompts thereby eliminating the need for an intermediate computer terminal. Further, an adaptive printer-based application framework may also be configured such that, rather than the application being largely processed by the printer or a locally connected computer terminal, the application may be implemented at the server and the printer may operate as a front-end to the server-implemented application. In some example embodiments, this architecture may reduce the processing requirements of the printer, since at least part of the processing is being implemented by the server, rather than by the printer.

Establishing Remote Connections

FIG. 3 illustrates a flowchart of operations providing a secure connection between devices, such as a printer and a server, according to some example embodiments.

In many networks, managing printers typically requires setting up a central server or using a plurality of locally connected computers to manage the printers. Further, managing such printers remotely may require allowing external access to the printers and the network by exposing the printers through a network firewall or other security device or by setting up a virtual private network (VPN) to access the printer through the network. Establishing a connection between a remote server and a printer within a network requires the remote server to initiate the connection with the printer, often creating issues with a network firewall. For example, network firewalls are often configured to only allow outgoing connections and as such would cause the connection request from the remote sever to be denied. Alternatively, a network firewall may view the remote connection request as a non-standard Internet connection and block the connection. Establishing these remote connections may require changes to a network firewall's settings to allow such connections, and may then raise issues regarding security or control of such remote connections.

According to some example embodiments of the present invention, a printer may be configured to initiate a first connection to a remote server, such as a server residing in the cloud. Such a connection may be maintained as a persistent connection with little overhead allowing a printer or server to send data at any time without a need to reconnect, even after long periods of inactivity. For example, a printer may request to connect to the remote server according to the example embodiments, and then establish a persistent connection that may remain open until the printer is shut down. In some example embodiments, the printer initiating the connection request to a remote server which is outside a network firewall allows for the connection to be made without necessitating any changes to a network firewall.

According to some example embodiments, the printer may initiate a connection with the remote server using data communication protocols or request-response protocols such as HTTP or HTTPS and request that the connection then be converted to a HTML 5 WebSocket protocol (WebSocket) connection (defined by Internet Engineering Task Force RFC 6455—http://tools.ietf.org/html/rfc6455). Such a WebSocket connection may allow the printer and remote server to communicate as if they were connected behind the same firewall, such as through a traditional TCP RAW port (e.g., port 9100). A WebSocket connection may provide full-duplex communication channels over a single connection, such as a Transmission Control Protocol (TCP) connection.

According to some example embodiments, such a connection acts as a bidirectional channel allowing either side to transmit data as it becomes available. According to some example embodiments, such a connection may further allow data to be transmitted using various public or proprietary formats or languages, such as Java Script Object Notation (JSON) or Zebra Set Get Do (SGD).

As illustrated in FIG. 3, a connection process according to example embodiments begins when a printer is connected to a network and powered on, as shown at block 302. In order to initiate a first connection to a server, the printer may send a connection request using a data communication protocol or request-response protocol, such as an HTTP or HTTPS request (e.g., over TCP port 80 or 443) to a designated server, as shown in block 304. In some embodiments, one or more designated servers may be identified using defined variables or settings and may be stored in a memory of the printer, such as memory 904 of FIG. 9. The connection request may indicate to the server that the printer desires to use Transport Layer Security (TLS) or Secure Socket Layer (SSL) to provide a secure channel between the printer and the server. In some embodiments, the request may further indicate that the connection should be upgraded to a WebSocket connection (e.g., a bi-directional, persistent communication channel). Such a connection request may be recognized as or treated as a standard web browser request, such as a communication between a web browser and a web site. The server may indicate whether or not it accepts the connection request at block 306. If the server denies the connection request, the process may continue to block 322 where an error is reported and then the process ends at block 324.

If, at block 306, the server accepts the connection request, the server may then send its security certificate and connection parameters to the printer. In some embodiments, the server's security certificate is only valid if it is signed by a designated CA, such as the printer manufacturer. This designated CA signed certificate may be used to ensure that designated printers only connect to trusted and approved servers. At block 310, the printer may then evaluate the server's security certificate. For example, the printer may analyze data in the security certificate to ensure that it is connecting to the expected printer, such as verifying that the DNS name in the certificate matches the URL used to send the request. The printer may further evaluate the certificate to ensure that the certificate is signed by the expected CA, such as the printer manufacturer.

If the printer does not accept the certificate at block 312, the process may continue to block 322 where an error is reported and then the process ends at block 324. If the printer accepts the server certificate at block 312, the process may continue to block 314 where the printer may send its security certificate to the server.

According to some example embodiments, client authentication is further enforced as one example, by the remote server ensuring that only approved printers (e.g., printers of a particular manufacturer) can connect to the remote server. In such embodiments, a printer may contain a private/public key pair and its own security certificate (signed by the designated CA) to provide authentication to the remote server. In some example embodiments, a group of printers may all share a common security certificate signed by the designated CA (e.g., the printer manufacturer) that may provide authentication to the remote server that a printer is an authorized printer.

At block 316, the server may evaluate the printer's security certificate. For example, the server may analyze the printer's certificate to ensure that the certificate is signed by the expected CA and that the printer is one of the printers that the server expects to make connections with (e.g., the printer is a particular type of printer, a printer of a particular manufacturer, or from an expected network).

If the server does not accept the certificate at block 318, the process may continue to block 322 where an error is reported and then the process ends at block 324. If the server accepts the printer certificate at block 318, the process may continue to block 320 where the WebSocket connection is established between the printer and server, such as by the server upgrading the connection to the WebSocket protocol. The printer and the server may then each begin sending data to the other, such as printing commands or control data, over the WebSocket connection. In one embodiment. JSON. SGD, or the like, may be used for sending the data between the server and the printer.

Providing Multiple Communication Channels Between a Printer and Server

FIG. 4 illustrates a flowchart of operations to establish multiple bi-directional communication channels over the connection between a server and a printer according to various example embodiments. According to some example embodiments, once an initial connection, such as the initial WebSocket connection, is established between a printer and a server, that initial connection may be considered the main channel and used to exchange proprietary control messages between the server and the printer. According to some example embodiments, the printer and server may then establish separate communication channels over the same connection or over separate connections (e.g., TCP connections) for exchanging different types of messages or data. The main channel may, for example, be used by the server to indicate when a new channel should be opened between the printer and the server for exchanging other types of data and messages. According to some example embodiments, such additional channels may only be established at the request of the server with the initial connection between the printer and the server being the only one that can be initiated without the server's prior permission. According to some example embodiments, the channels may be separate and independent from each other such that they do not rely on the state of any other channel. For example, in some embodiments, if one communication channel becomes locked, the server and the printer may still communicate over one of the other channels. In such an embodiment, the server may be able to communicate with the printer over one of the other channels to instruct the printer to close the locked channel and establish a new channel of the same type. For example, the separate channels may allow for different types of communications to be exchanged between the server and printer at the same time, instead of having to interrupt a transmission or wait for a first transmission to complete. For example, a printer may be able to receive setting updates on one channel even while it is receiving bandwidth filling print commands over another channel, or a server application may be able to request printer status over one channel while a format is being sent over a separate channel.

In some embodiments, the separate channels may be provided by an application protocol sitting on top of a communication protocol layer. As such, the channels of the example embodiments are separate from any processes of the communication protocol, such as channel-hopping in a wireless network.

According to some example embodiments, establishing separate channels may provide for finer control by a system administrator of what functionality may be available to a user on a network printer. For example, a standard TCP Raw port connection for a network printer allows a user to do anything from formatting print jobs, to modifying settings and downloading new firmware. Establishing separate channels for different types of protocols or functionality may allow an administrator to control the channels independently, such as by configuring different security levels on the different channels to prevent a user from accessing configuration settings while still allowing them to format print jobs.

As illustrated in FIG. 4, the initial (main) WebSocket connection may be established between the printer and the server, shown at block 402, as previously described. The server may then determine that a new communication channel should be opened such that a particular type of data may be exchanged between the server and the printer, as shown at block 404. If the server does not determine a new channel needs to be established, the process may return to block 402 and wait for a future determination. If the server determines a new channel needs to be established, the process continues to block 406.

At block 406, the server may send a message to the printer to establish a new channel. Such message may include at least an indication of a type of channel and the permissions to be used for the channel. For example, the server may send a message over the initial connection to the printer with a request to establish a new channel for a particular protocol, such as a firmware update channel. At block 408, the new channel may be established between the printer and the server. In some embodiments, the printer may respond to the server and attempt to connect with the new channel by sending a message comprising the printer's unique ID, a channel name, and a channel ID. In some embodiments, the printer's unique ID may comprise the printer serial number, the channel name may comprise an alphanumeric string using a dot-delineation notation, and the channel ID may be assigned by the printer. At block 410, the printer and server may then perform bidirectional communication on the new channel based on a protocol designated for the new channel. For example, such channels may include, but are not limited to, a proprietary command channel, a configuration channel, a status channel, a TCP RAW port channel, a file transfer channel, a firmware upgrade channel, a secure TCP RAW channel, or any other appropriate channel to communicate between the server and the printer.

In some embodiments, the multiple communication channels may be provided over the same connection, such as a single TCP connection. In one embodiment, the channels may be overlapped, such as multiple logical channels over the single connection. In some such embodiments, to identify the data for the separate channels, the transmissions may be packaged with leading identifiers, for example using a JSON string, XML, a proprietary format, or the like. For example, a packaged transmission may comprise the channel name and channel ID followed by the data payload.

FIG. 7 illustrates one example of a connection between a printer and a server, such as a WebSocket connection, having multiple channels according to some example embodiments. As shown in FIG. 7, a remote server (e.g., an application server, a third-party (manufacturer) hosted server), such as server 200, may reside in a distributed network, such as the cloud 206, as described above with regard to FIG. 2. A printer 202 may establish a connection to the remote server 200, such as a WebSocket connection 702, through the distributed network or cloud 206, as provided in the example embodiments and described above. For example, the printer may initiate a connection request to a designated server residing in the cloud and indicate that the connection should be upgraded to a WebSocket connection.

Once the WebSocket connection 702, which may be a secure bi-directional connection, has been established between the printer 202 and the server 200, the server 200 may request that additional separate bi-directional communication channels be established using the WebSocket connection, to provide various functionality between the printer and server. For example, the server 200 may send a request to the printer 202 to establish a first additional communication channel 704 to enable a first type of communication between the server and the printer. The server 200 may then send a request to the printer 202 to establish a second additional communication channel 706 to enable a second type of communication between the server and the printer. For example, in one embodiment, the first channel 704 may be used to exchange print commands while other channels, such as second channel 706, exchange data unrelated to printing. For example, second channel 706 may be used to provide a file transfer, a firmware upgrade, requests and response for printer status, provisioning information, alert notifications, or any other appropriate data exchange between the printer and server.

In some embodiments, each of the separate channels may be configured with different security levels and may or may not be encrypted and the communications for each channel may be independent from each of the other channels. For example, the printer and the server may communicate over the multiple individual channels simultaneously with no dependence on the status of any of the other channels.

Providing for Remote Configuration of Printers

FIG. 5 illustrates a flowchart of operations to provide automated provisioning of a printer according to various example embodiments. According to some example embodiments, establishing a cloud connection between a server and a printer may allow for automated provisioning of the printer. For example, rather than a technician having to individually access each printer at a user site or open each box at the manufacturer to deploy customized configurations for the printers, a printer may be configured to allow for "self-provisioning" upon initially being connected to a network at a user location, for example, such as by using a WebSocket connection as described above. According to some example embodiments, the connection between the printer and server allows for the configuration information to be transmitted between the printer and server through the firewalls, proxy servers, etc., of the user's network without having to modify the standard network settings on the various devices.

According to some example embodiments, a printer may be first put into service by connecting it to a user network and powering it up. Upon being initially connected to the user network, the new printer may first establish a WebSocket connection to a designated server (e.g., a server hosted by a manufacturer and storing configuration profiles), at block 502, as previously described. Once the connection has been established, the printer may send a message to the designated server identifying the printer at block 504. For example, a printer may send a discovery packet that contains information about the printer including at least a unique printer ID (e.g., a printer serial number). At block 506, the server may use the unique printer ID to determine a group ID associated with the printer, (e.g., a group ID may identify a particular customer or a particular group of purchased printers). In some embodiments, a number of printers that are all to be configured alike may be assigned to a single group ID where the group ID indicates a particular configuration profile to be used. At block 508, if the server is unable to determine a group ID associated with the printer ID, the process may continue to block 514 where an error is reported and then the process ends at block 516. If the server determines the appropriate group ID at block 508, the process then continues to block 510.

At block 510, the server retrieves the configuration files associated with the group ID. At block 512, the server sends the configuration files or messages to the printer and configures the printer for operation via the connection, such as by using JSON, SGD, or the like.

Providing Remote Notifications from a Printer

FIG. 6 illustrates a flowchart of operations to provide alert notifications from a printer according to various example embodiments. According to some example embodiments, a printer connected to a remote server, such as using a WebSocket connection, may generate and send alert notifications to the remote server so that some action may be performed. The printer may be configured such that these alert notifications may be transmitted using various data communication protocols, such as HTTP POST, so that they are processed through the networks, such as by firewalls, proxy servers, or the like, similarly to standard web browser requests. For example, the printer may be configured to send alert notifications regarding the status of the printer (e.g., offline, print error, ribbon replacement required, ribbon low, media replacement required, media low, etc.), changes to settings or data stored in the printer, changes to communication channels, or any other type of notification. In some embodiments, the server may be configured to process the alert notifications such as by sending messages to a user device (e.g., an administrator or technician's mobile device), providing data to an application, sending data to a management server, generating event traps, or the like.

According to some example embodiments, the printer may have user-defined settings (e.g., local storage variables) that can be used to store data that may be transmitted to a remote server (e.g., an application server) and used by the server to perform some action. For example, user-defined settings on a printer may be established, such as in a memory of the printer, to store a logo, company name, local name information, location information, or such, that may be transmitted to the server for use by the server in formatting a particular print job to be sent back to the printer, such as formatting a customized label based on the location or use of the printer. Such user-defined settings may also be used to store data received at the printer from a peripheral device, such as barcode data received from a scanner. In some embodiments, the data stored in these user-defined settings may then be transmitted to the server so that the server may retrieve information associated with the data (e.g., user data at the server or third-party data from the Internet) for use in a particular operation, such as in one example retrieving data from a website based on a scanned UPC for use in formatting a particular label for the printer. According to some example embodiments, the data stored in a user-defined variable may not be used locally by the printer, but instead may be just stored at the printer and transmitted to the remote server when triggered, such as by using a defined channel.

At block 602, the printer may establish a connection to the server, such as through a WebSocket connection as previously described. Optionally, at block 604, a printer setting may be modified, such as by storing data received from a peripheral device or from a user via an interface, or a printer status may change requiring a notification to a technician or administrator.

At block 606, the printer may determine if a condition exists that triggers an alert notification. For example, the status of the printer may change or a certain amount of data may be received or stored for a user-defined setting. If an alert notification is not triggered at block 606, the printer may return to the start of the process and wait for a next determination to occur. If at block 606, an alert notification is triggered, the process continues to block 608.

At block 608, the printer may generate and send an alert notification to the server. The alert notification may comprise an alert message along with the unique printer ID. In some embodiments, the alert message may comprise data received or stored at the printer, a status or configuration change, or the like.

At block 610, the server may take some predefined action based on the received alert notification. For example, the server may perform a search based on information contained in the alert message, such as barcode data, and use the retrieved information to format a print job to be sent to the printer, the server may send a message to a technician or administrator regarding service or operations of the printer, or the server may send data to another device, such as a management server.

Providing a Printer-Based Application Framework

FIG. 8 illustrates an example adaptive printer-based application framework according to some example embodiments. An adaptive printer-based application framework may provide for the development of applications that involve the use of a printer within an application server environment, without requiring an intermediate computer terminal. For example, such an application framework may allow for applications to be developed and implemented on an application server with the printer providing a user interface front-end to provide input and/or output. For example, the application may be implemented such that much of the processing occurs on the application server, not at the printer. The application server 200 and the printer 202 are included in FIG. 8 as the hardware devices that implement various aspects of the framework. In this regard, the application server 200 may implement a specific server-implemented application for performing a particular task or functionality that leverages the hardware of the printer 202.

The application server may also implement a server-side software development kit (SDK) module 802. The server-side SDK module 802 may provide an environment in which software (e.g., the server-implemented application 800) can be developed for use within the adaptive printer-based application framework. In this regard, the server-side SDK module 802 may include a collection of pre-defined code objects that control or otherwise interface with the various functional aspects of the printer to perform a task. The pre-defined code objects may be utilized during application development to generate special-purpose applications that are executed on the application server 200 within the adaptive printer-based application framework. It is understood that although the server-side SDK module 802 is illustrated on the application server 200, application development may be performed on any type of computing device with the assistance of the server-side SDK module 802 and then installed on the application server 200 after being developed elsewhere.

The printer 202 may implement a local operating system 810, upon which a printer front-end application 812 is implemented. The printer front-end application 812 may receive and act upon instructions and requests from the server-implemented application 800. In this regard, the front-end application 812 may be configured to interface with the various hardware of the printer 202 to control the hardware to perform particular tasks. For example, when properly instructed by the server-implemented application 800, the front-end application 812 may be configured to operate the printing hardware (e.g., printhead, platen, motor operators, etc.), the display screen, the keypad, the communications ports (e.g., communications ports connected to peripheral devices including, for example, a barcode scanner), on-printer memory (e.g., memory dedicated to variables), network connectivity, and the like.

The printer front-end application 812 may incorporate a variety of sub-modules for handling various controls, messaging, and various other functionalities. The server-implemented application 800 may be specifically configured to execute particular tasks in response to instructions and requests provided by the server-implemented application 800. In this regard, the instructions and requests may be implementations of the pre-defined code objects offered in the server-side SDK module 802. As implementations of the pre-defined code objects, the instructions and requests may be configured to interface with various sub-modules that form at least a portion of the printer front-end application 812. Some example sub-modules include a display screen control module 814, a messaging module 816, a communications port capture module 818, and an on-printer general purpose variable interface module 820.

The display screen control module 814 may be configured to receive instructions from the server-implemented application 800 and output information (e.g., control prompts, error notifications, or other information) on a display device of the printer 202. The display screen control module 814 may operate in conjunction with a module that retrieves user input from a keypad to implement soft keys and the like. In example embodiments where the printer 202 includes a touch screen display, the display screen control module 814 may also be configured to handle and forward indications of user inputs via the touch screen display.

The messaging module 816 may be configured to handle messaging between the server-implemented application 800 and the printer front-end application 812. The messaging module 816 may be configured to route and control the flow of messages to and from various modules of the printer front-end application 812 to the server-implemented application 800. The messaging module 816 may also be configured to cause the printer 202 to take action to manage (e.g., connect, disconnect, maintain, etc.) network connectivity with the application server 800.

The communications port capture module 818 may be configured to interface with the printer 202's wired or wireless communication ports. The communications ports may be configured to connect and maintain a communications session with a variety of peripheral devices including, for example, a barcode scanner, a magnetic card reader, a keyboard, a display panel, or the like. In some example embodiments, the communications port capture module 818 may be configured to retrieve and store data that has been obtained via the port (e.g., barcode data) for subsequent forwarding to the server-implemented application 800.

To support the operation of the printer front-end application 812, the various modules may utilize allocated memory on the printer 202. The allocated memory may be managed by the on-printer general purpose variable interface module. In this regard, particular memory locations of a memory device of the printer 202 may be allocated for storing the values of general purpose variables. These memory locations may be leveraged to support the operation of the printer front-end application 812, and, in turn, the server-implemented application 800. According to some example embodiments, the server-implemented application 800 may assign a variable to a respective memory location and utilize the memory location for storage of a value associated with that variable during execution of the server-implemented application.

FIG. 8 illustrates an example system where the application server 200 supports the operation of a single printer 202. However, according to some example embodiments, the application server 200 may execute multiple instances of server-implemented applications 800 that interface with respective printers (and respective printer front-end applications). Further, according to some example embodiments, a second printer may be transitioned into an active server-implemented application with a first printer, when, for example, the first printer is inoperable. A user or session token may be used to facilitate the transition. Additionally, according to some example embodiments, because the server-implemented application resides on the application server, to update the software applications, the updates need to be performed only on the application server (not on the individual printers that the application server may support).

Exemplary System Architecture

The description provided above and generally herein illustrates example methods, example apparatuses, and example computer programs stored on a non-transitory computer readable media for implementing functionality for cloud connected printers. FIG. 9 illustrates an example block diagram of an apparatus 900 that includes print hardware and printer functionality. Apparatus 900 is configured to support connections to a server as described above via utilization of a processor 902, a memory device 904, a user interface 906, a communication interface 908, a print job manager 910, print hardware 912, and a printer front-end application 914.

The processor 902 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 902 may be representative of a plurality of processors, or one or more multiple core processors, operating in concert. Further, the processor 902 may be comprised of a plurality of transistors, logic gates, a clock (for example, oscillator), other circuitry, and the like to facilitate performance of the functionality described herein. In some example embodiments, the processor 902 is configured to execute instructions stored in the memory device 904 or instructions otherwise accessible to the processor 902. The processor 902 may be configured to operate such that the processor causes the apparatus 900 to perform various functionalities described herein.

Whether configured as hardware or via instructions stored on a computer-readable storage medium, or by a combination thereof, the processor 902 may be an entity capable of performing operations according to embodiments of the present invention while configured accordingly. Thus, in example embodiments where the processor 902 is embodied as, or is part of, an ASIC, FPGA, or the like, the processor 902 is specifically configured hardware for conducting the operations described herein. Alternatively, in example embodiments where the processor 902 is embodied as an executor of instructions or computer program code stored on a non-transitory computer-readable storage medium, the instructions specifically configure the processor 902 to perform the algorithms and operations described herein. In some example embodiments, the processor 902 is a processor of a specific device (e.g., a printer) configured for employing example embodiments of the present invention by further configuration of the processor 902 via executed instructions for performing the algorithms, methods, and operations described herein.

The memory device 904 may be one or more non-transitory computer-readable storage media that may include volatile and/or non-volatile memory. In some example embodiments, the memory device 904 includes Random Access Memory (RAM) including dynamic and/or static RAM, on-chip or off-chip cache memory, and/or the like. Further, memory device 904 may include non-volatile memory, which may be embedded and/or removable, and may include, for example, read-only memory, flash memory, magnetic storage devices or the like. Memory device 904 may include a cache area for temporary storage of data. In this regard, some or all of memory device 904 may be included within the processor 902. Memory device 904 may be further configured to store data for general purpose or user-defined settings or variables for use in accordance with example embodiments described herein.

Further, the memory device 904, which may be one or more memory devices, may be configured to store information, data, applications, computer-readable program code instructions, and/or the like for enabling the processor 902 and the example apparatus 900 to carry out various functions in accordance with example embodiments of the present invention described herein. For example, the memory device 904 could be configured to buffer input data for processing by the processor 902. Additionally, or alternatively, the memory device 904 may be configured to store instructions for execution by the processor 902.

The communication interface 908 may be any device or means (for example, circuitry) embodied in hardware, a computer program product, or a combination of hardware and a computer program product that is configured to receive and/or transmit data from/to a network 920, a peripheral device 930, and/or any other device or module in communication with the example apparatus 900. The communications interface may be configured to communicate information via any type of wired or wireless connection, and via any type of communications protocol, such as a communications protocol that supports near field communications. According to various example embodiments, the communication interface 908 may be configured to support the transmission and reception of communications in a variety of networks including, but not limited to Internet Protocol (IP)-based networks (for example, the Internet) or the like. Further, the communications interface 908 may be configured to support device-to-device communications. Processor 902 may also be configured to facilitate communications via the communications interface 908 by, for example, controlling hardware comprised within the communications interface 908. In this regard, the communication interface 908 may comprise, for example, communications driver circuitry, one or more antennas, a transmitter, a receiver, a transceiver and/or supporting hardware, including, for example, a processor for enabling communications.

The user interface 906 may be in communication with the processor 902 to receive user input via the user interface 906 and/or to present output to a user as, for example, audible, visual, mechanical or other output indications. The user interface 906 may include, for example, a keyboard or keypad, a display (for example, a touch screen display), or other input/output mechanisms. Further, the processor 902 may comprise, or be in communication with, user interface circuitry configured to control at least some functions of one or more elements of the user interface. The processor 902 and/or user interface circuitry may be configured to control one or more functions of one or more elements of the user interface through computer program instructions (for example, software and/or firmware) stored on a memory accessible to the processor 902 (for example, volatile memory, non-volatile memory, and/or the like). In some example embodiments, the user interface circuitry is configured to facilitate user control of at least some functions of the apparatus 900 through the use of a display and configured to respond to user inputs. The processor 902 may also comprise, or be in communication with, display circuitry configured to display at least a portion of a user interface, the display and the display circuitry configured to facilitate user control of at least some functions of the apparatus 900.

The print hardware 912 may include the various hardware devices and components that support printing on a media. In this regard, the print hardware 912 may include rollers, platens, motor operators, printheads, print ribbons, and other hardware configured to support printing on a media. Media may also support machine-readable data, such as a magnetic stripe, RFID tag, NFC tag, or magnetic memory. In this regard, the print hardware may also include hardware configured to support storing data in these fields, or reading and writing data to these devices, such as a magnetic stripe reader, an RFID interrogator, an NFC module, or a memory reading device.

The print job manager 910 may be embodied in hardware (e.g., in the form of an ASIC or FPGA) or as instructions executed by the processor 902 to control the operation of printing. In this regard, the apparatus 900 may be configured to receive a print job, and under the control of the print job manager 910, the apparatus 900 may print information or a design on a media. The print job manager 910 may also be configured to manage spooling and buffering of print jobs.

The printer front-end application 914 may be embodied in hardware (e.g., in the form of an ASIC or FPGA) or as instructions executed by the processor 902 to support the operation of an adaptive printer-based application framework. In this regard, the apparatus 700 may be configured to receive instructions and requests from a server-implemented application, and act upon those instructions or requests via the implementation of the printer front-end application 914.

FIG. 10 illustrates an example system in accordance with some example embodiments. The example system includes a printer 1000 and a scanner 1010. The printer 1000 is configured to wirelessly connect to the scanner 1010 to receive data obtained by the scanner 1010 and to otherwise communicate with the scanner 1010. The printer 1000 may also include a display 1002 and a keypad 1004. Via the implementation of a printer front-end application, the printer 1000 may be configured to interact with the scanner 1010, the display 1002, and the keypad 1004, in response to instructions or requests from a server-implemented application.

For example, the printer 1000 may be configured via a server-implemented application to receive information obtained from a scan of the barcode 1020 and store that information in an on-printer general purpose variable. The stored information may then be forwarded via a network connection to the server-implemented application for analysis. The analysis may include, for example, retrieving data (e.g., internal or third-party data) associated with the barcode and using the retrieved data to format specific print jobs. In another example, the analysis may include logging in a user that is associated with the barcode information and allowing the user to use the printer.

In another example, a printer and scanner pairing operation may be implemented via the dynamic printer-based application framework. In this regard, the scanner 1010 may scan and obtain barcode information from a label affixed to the printer 1000, and pair the devices together for communications, inventory, or the like.

The description herein provides example methods and computer program products in accordance with various example embodiments of the present invention. Systems, methods, and computer program products according to example embodiments of the invention are therefore provided. Means for implementing the functionality of example embodiments of the invention described herein may include hardware, and/or a computer program products including a computer-readable storage medium having one or more computer program code instructions, program instructions, or executable computer-readable program code instructions store therein. In this regard, program code instructions may be stored on a memory device, such as the memory device 904, and executed by a processing circuitry, such as the processor 902. As will be appreciated, any such program code instructions may be loaded onto a computer or other programmable apparatus from a computer-readable storage medium to produce a particular machine, such that the particular machine becomes a means for implementing the functions specified. These program code instructions may also be stored in a computer-readable storage medium that can direct a computer, processing circuitry, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified. The program code instructions may be retrieved from a computer-readable storage medium and loaded into a computer, processing circuitry, processor, or other programmable apparatus to configure the computer, processing circuitry, processor, or other programmable apparatus to execute operational steps to be performed on or by the computer, processing circuitry, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide steps for implementing the functions specified. It will also be understood that the functionality described herein may be implemented by special purpose hardware-based computing systems and/or processors which perform the specified functions or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the description provided herein. In this regard, for example, different combinations of elements and/or functions other than those explicitly described above are also contemplated. Although specific terms are employed herein, they are used in a generic and descriptive sense only and not for purposes of limitation.

That which is claimed:

1. A printer comprising:

communications circuitry configured to facilitate communications with a server; and processing circuitry configured to:

transmit a connection request to a server via a network;

receive requested connection parameters from the server, wherein the requested connection parameters comprise at least a signed security certificate for the server;

verify the signed security certificate for the server;

transmit printer connection parameters to the server;

establish a first secure connection comprising a first channel between the printer and the server, the first channel configured for data communication of a first type;

receive a request from the server to establish a second channel;

respond to the request with a response message that includes a channel ID for the second channel; and establish the second channel, the second channel configured for data communication of a second type.

2. The printer of claim 1, wherein the connection request comprises at least a request to upgrade the connection to a WebSocket connection.

3. The printer of claim 1, wherein the printer connection parameters comprise at least a signed security certificate for the printer.

4. The printer of claim 1, wherein the response message further includes a printer ID and a channel name.

5. The printer of claim 1, wherein communications on the second channel is independent of a status of the first channel.

6. The printer of claim 1, wherein the processing circuitry is further configured to:

transmit or receive print commands over the first channel; and transmit or receive other data over the second channel.

7. The printer of claim 6, wherein the other data comprises at least one of data associated with file transfers, requests for printer status, changes in printer status, stored data, configuration information, changes to a communication channel, alert notifications, or firmware upgrades.

8. The printer of claim 1, wherein the processing circuitry is further configured to store data in one or more memory locations and transmit the stored data over one of the one or more additional communication channels.

9. The printer of claim 8, wherein the processing circuitry is further configured to:

receive data from one or more peripheral connected to the printer; and store the received data in the one or more memory locations.

10. The printer of claim 1, wherein the processing circuitry is further configured to:

transmit a message to the server over the secure connection, wherein the message comprises at least a unique printer identifier;

receive configuration information from the server based at least in part on the message; and modify the printer configuration based on the received configuration information.

11. The printer of claim 1, wherein the printer further comprises a user interface providing an application front-end interface for an application implemented on the server.

12. A method comprising:

transmitting a connection request to a server via a network;

receiving requested connection parameters from the server, wherein the requested connection parameters comprise at least a signed security certificate for a server;

verifying the signed security certificate for the server;

transmit printer connection parameters to the server;

establishing a first secure connection comprising a first channel between the printer and the server, the first channel configured for data communication of a first type;

receiving a request from the server to establish a second channel;

responding to the request with a message that includes a channel identifier for the second channel; and establishing the second channel, the second channel configured for data communication of a second type.

13. A server comprising:

communications circuitry configured to facilitate communications with a network; and processing circuitry configured to:

receive a connection request from a printer;

transmit requested connection parameters to the printer, wherein the requested connection parameters comprise at least a signed security certificate for the server;

receive printer connection parameters from the printer;

establish a first secure connection comprising a first channel between the server and the printer for data communication of a first type;

transmit a request to the printer to establish a second channel;

receive a response message from the printer with a channel ID for the second channel; and establish the second channel, the second channel for data communication of a second type.

14. The server of claim 13, wherein the connection request comprises at least a request to upgrade the connection to a WebSocket connection and wherein the processing circuitry is further configured to upgrade the connection to a WebSocket connection.

15. The server of claim 14, wherein the processing circuitry is further configured to:

receive a message from the printer, wherein the message comprises at least a unique printer identifier;

identify configuration information based at least in part on the received message; and transmit the configuration information to the printer.

16. The server of claim 13, wherein the response message from the printer further includes a printer ID and a channel name.

17. The server of claim 13, wherein communications on the second channel is independent of a status of the first channel.

18. The server of claim 13, wherein the processing circuitry is further configured to:

transmit or receive print commands over a first channel; and transmit or receive other data over the second channel.

19. The server of claim 18, wherein the processing circuitry is further configured to:

receive data from the printer over one of the second channel;

process the received data; and transmit the processed data to the printer over the second channel.

20. The server of claim 13, wherein the other data comprises at least one of file transfers, requests for printer status, changes in printer status, stored data, configuration information, changes to a communication channel, alert notifications, or firmware upgrades.

* * * * *